Feb. 24, 1942.  C. S. ALLEN  2,274,026
ARM PROTECTOR FOR AUTOMOBILE DOORS
Filed Nov. 12, 1940
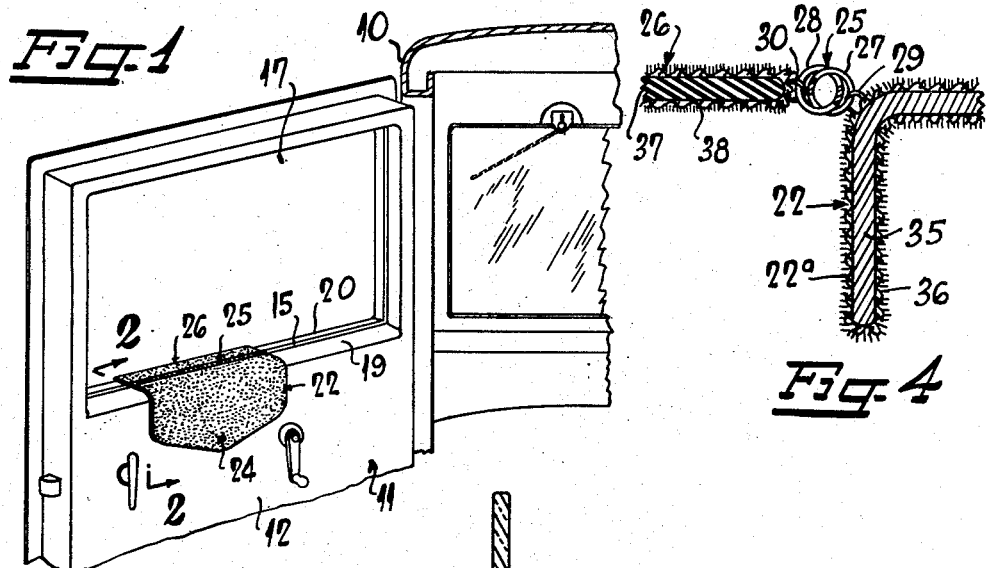
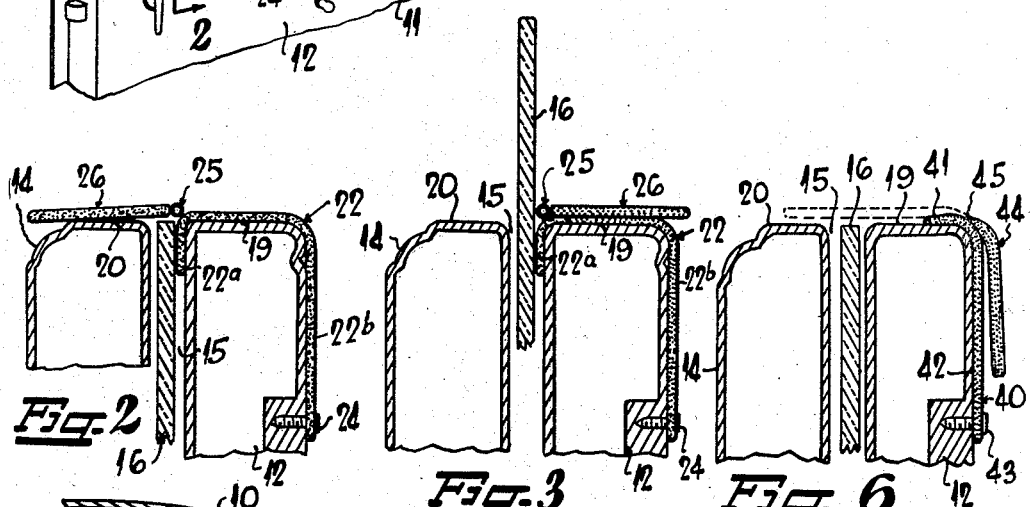
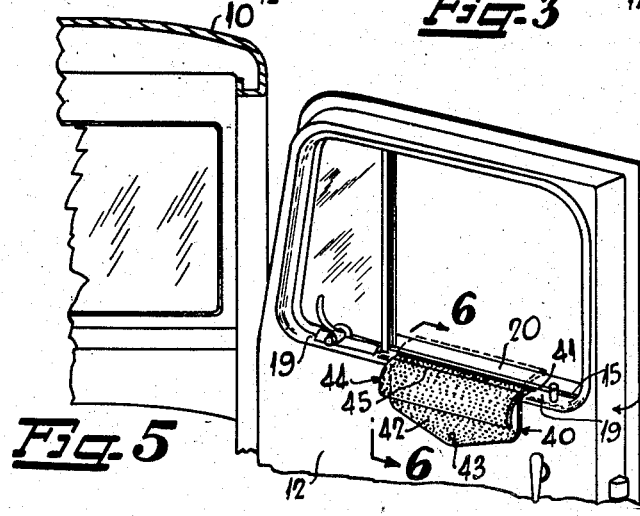
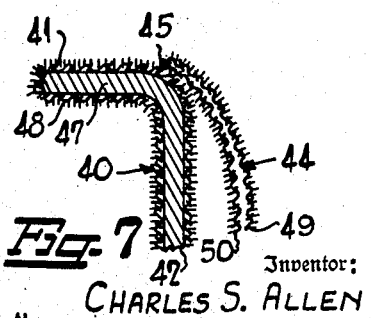
Inventor:
CHARLES S. ALLEN
By Eaton + Brown
Attorneys Patented Feb. 24, 1942

2,274,026

UNITED STATES PATENT OFFICE 2,274,026

ARM PROTECTOR FOR AUTOMOBILE DOORS

Charles S. Allen, Sarasota, Fla.

Application November 12, 1940, Serial No. 365,309

7 Claims. (Cl. 155—198)

This invention relates to an arm protector which is adapted to be secured to an automobile door. It is a well known fact that occupants of the front seat of an automobile often rest their arms upon the adjacent window sills in order to relax in a comfortable position while riding. Since most sills are made from metal or other material which readily absorbs and retains heat, they very often get so hot after standing in the sunshine on a hot day that the occupant cannot place his arm upon the sill without suffering shock and sometimes suffering burns. Furthermore, highly finished paint or enamel on the sill is often damaged by sweat and grime which is the result of a perspiring arm being placed thereon, leaving a deposit of salt.

It is an object of this invention to provide an improved protector for automobile window sills which protector is made of a suitable material which does not readily absorb heat; whereby the occupants' arms will be shielded from excess heat and the sill will be protected from the sweat of the occupants' arms.

It is another object of this invention to provide a protector of the class described comprising a rigid plate member secured to the inside wall of the automobile door, the plate having the upper portion thereof extending laterally over the inside portion of the window sill, and also having a flexible flap pivoted to the laterally extending portion. This type of construction permits the occupants to rotate the flexible member to an extended position to cover that portion of the door disposed outside the window pane or to rotate it inwardly so as not to obstruct the operation of the window pane.

Some of the objects of the invention having been stated, other objects will appear as the description proceeds, when taken in connection with the accompanying drawing, in which—

Figure 1 is a view of a portion of an automobile showing the door thereof in opened position and having my improved protector mounted thereon;

Figure 2 is a view taken along the line 2—2 in Figure 1;

Figure 3 is a view similar to Figure 2, but showing the parts in a different position;

Figure 4 is an enlarged sectional view similar to the upper central portion of Figure 2, showing the hinged joint between the two members and the details of the members which make up my improved protector;

Figure 5 is a view similar to Figure 1, but showing a slightly modified form of protector mounted on the door;

Figure 6 is a view looking along the line 6—6 in Figure 5;

Figure 7 is an enlarged sectional detail view through the upper portion of the protector showing in detail the structures which make up the respective parts.

Referring more specifically to the drawing, the numeral 10 denotes the body of an automobile having a door, broadly designated by the reference character 11. This door comprises inner frame 12 and an outer frame 14, said frames being spaced apart from each other, leaving a slot 15 therebetween. This slot is adapted to accommodate a window pane 16, which pane may be operated by a suitable mechanism, not shown, to lower the same to the position shown in Figure 2 or to raise the same to a position such as shown in Figure 3.

When the window pane 16 is raised it serves to close an opening 17 in the upper portion of the door 11. It will be noted that the upper edges of the frames 12 and 14 are substantially on the same level and serve as suitable window sills 19 and 20, respectively. As heretofore stated, the sunshine very often causes these sills to become so hot that the occupant's arm will become burned or scorched when placed thereon. Also since these sills are usually made of a highly polished metallic substance they absorb heat, and when this heat comes in contact with perspiration from the occupant's arm, a reaction takes place which serves to mar the finish coating of the sills.

In order to provide a means whereby the occupant's arm, as well as the window sills will be protected, a suitable shield has been provided. This shield comprises a substantially inverted L-shaped member 22, said member being adapted to fit downwardly over the top of sill 19, so that its downwardly extending legs 22a and 22b will engage the opposed faces of the window frame 12. The longer leg 22b is adapted to have its lower end fastened to the vertical face of frame 12 by any suitable means such as a screw, nail or the like 24. The shorter leg 22a fits into the space 15 between window frame 12 and the pane 16. The purpose of the leg 22a is to more completely anchor the upper portion of the shield to the frame. It also seems to prevent the window pane from rattling if its edges have a loose fit in their guideways. The laterally extending portion of the shield 22 has a hinge 25 secured thereto, said hinge in turn being secured to one edge of a resilient flap or plate member 26. This hinge may be of any desired structure but is shown in detail in Figure 4 as comprising interlocking coiled springs 27 and 28 which are secured to members 22 and 26 by any suitable means, but as shown they are secured to the members 22 and 26, by means of stitches or other securing means 29 and 30 respectively. When the member 26 is rotated outwardly to the position shown in Figures 1 and 2, it serves to cover the upper edge of the pane 16 as well as the outside sill 20. When in this position, the entire upper surface of the sills 19 and 20 are covered for a substantial length. On the other hand when it is desired to raise the window pane 16, then the member 26 can be rotated back to the position shown in Figure 3 where it overlies the upper portion of member 22.

Figure 4 shows the detail structure in the members 22 and 26. It is here seen that the member 22 comprises a rigid plate-like member 35 made of steel or other suitable material, which member is covered by a suitable fabric 36, preferably of a pile or plush finish. The member 26 is formed from a very resilient material such as rubber 37 which rubber is covered by a suitable fabric 38 preferably of a plush or pile finish. This type of fabric does not retain heat readily, neither does it become so warm that discomfort or injury to the occupant's arm will likely occur. Also the finish provided by fabrics of this type serve to more adequately protect the finish of sills 19 and 20.

Another distinct advantage of having a rigid member 35 and a resilient member 37 is to prevent injury to the glass 16 when it is raised or lowered. Also the free end of the flexible member will yield readily to the occupant's arm when the flexible member is disposed in the position shown in Figure 3 and therefore will not present a hazard such as would be the case if it were a rigid member. Fig. 5 shows a slightly modified form of the invention applied to an automobile door 11a having a ventilator, in which the sill 19 has secured thereto an inverted L-shaped member 40, said L-shaped member having its laterally extending leg 41 extending a partial distance over the sill 19, whereas the vertically disposed leg 42 fits against the vertical inside face of the frame 12. The lower end of the leg 42 is secured to the interior face of the frame 12 by means of a suitable screw or nail 43. In order to provide a member which is capable of extending over the remaining portion of the sill 19 not covered by the leg 41, and also for extending over the upper edges of the pane 16 and the sill 20, a suitable flexible flap 44 is secured to the laterally extending portion 41 as at 45. This flap may be secured thereto by pivoting, sewing or other suitable means. When it is desired to place the flap 44 in operation it is only necessary to turn the same to the dotted line position shown in Figure 6, at which time the free end thereof will be in position for an arm rest. On the other hand when the pane 16 is raised and there is no need for the protector, the member 44 can be allowed to fall to bold line position as shown in Figure 6.

It is seen by referring to Figure 7 that the member 40 comprises base member 47 preferably made of metal or some other suitable rigid material, and this member is covered with a suitable fabric 48, preferably of pile or plush finish. The flap 44 comprises suitable layers of plush or pile fabric 49 and 40.

It is therefore seen that I have provided an improved arm rest comprising two members, one member being secured to the inside face of the door, and the other member being pivoted to the first member and being capable of rotating outwardly when it is desired to cover the entire surface of the window sills.

In the drawing and specification there has been set forth a preferred embodiment of the invention, and although specific terms are employed, they are used in a generic descriptive sense only and not for purposes of limitation, the scope of the invention being set forth in the appended claims.

I claim:

1. In combination with a pair of vertically disposed inner and outer window frames spaced apart from each other and having a window pane mounted for vertical sliding movement therebetween, said frames having the lower edges of the window opening thereof disposed substantially at the same level, an arm rest secured to the vertical face of said inner frame and having its upper portion extending laterally toward said pane and over the upper edge of the frame, and a second arm rest pivotally secured to said laterally extending portion for covering the upper portion of the other frame, said first arm rest being of sheet metal covered with fibrous material, and being bent to conform to the contour of the face and lower edge of the opening of the inner frame.

2. In combination with a pair of vertically disposed window frames spaced apart from each other and having a window pane mounted for vertical sliding movement therebetween, said frames having the lower edges of the window opening thereof disposed substantially at the same elevation, a bent plate member secured to the vertical face of the inner frame and having its upper portion extending laterally toward said pane and over the lower edge of the window opening of the inner frame, a flexible fabric covered flap pivotally secured to said laterally extending portion for covering the upper edge of the other frame, when in outfolded position.

3. An arm protector for the window sill of an automobile door comprising a fabric covered bent metallic plate member, a portion of which is disposed over the inner vertical face of the door and the remaining portion extending laterally over a part of the window sill, and a flexible pad having one edge attached to said laterally extending portion, the free edge of said pad being adapted to overlie the remaining portion of said sill when rotated outwardly.

4. In combination, with a pair of vertically disposed inner and outer window frames spaced apart from each other and having a window pane mounted for vertical movement therebetween, said frames having sills on the lower edges of the window opening disposed substantially at the same elevation, an inverted U-shaped fabric covered bent metallic plate mounted on the window sill of the inner frame, the leg portions of the U-shaped member fitting against the opposed faces of the frame and a second plate member pivotally secured to the U-shaped member and being adapted to cover the sill of the outer frame, when pivoted outwardly.

5. In combination inner and outer vertically disposed window frames spaced apart from each other and having a window pane mounted for vertical sliding movement therebetween, said frames having sills on the lower edges of the window openings disposed substantially at the same elevation, an inverted L-shaped fabric covered, metallic, bent member having one leg thereof secured to one face of the door and its other leg extending laterally over one of the sills, and a flexible member having one edge secured to said laterally extending leg and being adapted to cover the sill of the adjacent frame.

6. In an automobile door having a window opening, a vertically slidable pane for closing said opening, an arm rest comprising a fabric-covered, bent metallic plate secured to the inner surface of the door at a point below the lower edge of the window opening, said plate having its upper portion bent outwardly into a horizontal position and into close contact with the pane and in contact with the lower edge of the window opening, a flap pivotally secured at one edge to the horizontal portion and being swingable outwardly on its pivot when the pane is in lowermost position to cover the outer portion of the lower edge of the window opening.

7. In an automobile door having a window opening and a vertically slidable pane for closing said opening, an arm rest comprising a fabric-covered, bent metallic plate secured to the inner surface of the door at a point below the lower edge of the window opening, said plate having its upper portion bent outwardly into a horizontal position and into close contact with the pane and in contact with the lower edge of the window opening, a flap pivotally secured at one edge of the horizontal portion and being swingable outwardly on its pivot when the pane is in lowermost position to cover the outer portion of the lower edge of the window opening, said flap being covered with fabric to protect the arm of an occupant from experiencing heat shock when placed thereon after the door has been exposed to the sun's rays for a substantial period of time.

CHARLES S. ALLEN.